(12) United States Patent
Nakagawa et al.

(10) Patent No.: US 9,109,520 B2
(45) Date of Patent: Aug. 18, 2015

(54) CONTROL APPARATUS FOR INTERNAL COMBUSTION ENGINE

(75) Inventors: Norihisa Nakagawa, Numazu (JP); Takashi Nishikiori, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 152 days.

(21) Appl. No.: 13/883,584

(22) PCT Filed: Nov. 18, 2010

(86) PCT No.: PCT/JP2010/070579
§ 371 (c)(1),
(2), (4) Date: May 6, 2013

(87) PCT Pub. No.: WO2012/066666
PCT Pub. Date: May 24, 2012

(65) Prior Publication Data
US 2013/0231843 A1    Sep. 5, 2013

(51) Int. Cl.
F02D 41/22    (2006.01)
F02D 41/00    (2006.01)
(Continued)

(52) U.S. Cl.
CPC .......... *F02D 41/0002* (2013.01); *F02D 41/221* (2013.01); *B60W 10/06* (2013.01);
(Continued)

(58) Field of Classification Search
CPC . F01L 2800/11; F01L 2800/14; F02D 41/221
USPC ............ 701/102, 107, 114; 123/90.15–90.18, 123/198 F, 481; 73/114.79
See application file for complete search history.

(56) References Cited

U.S. PATENT DOCUMENTS 6,499,470 B2 *  12/2002  Takagi et al. ................. 123/481
6,691,021 B2 *  2/2004   Takagi et al. ................. 701/109
(Continued)

FOREIGN PATENT DOCUMENTS

DE    10 2007 013 2    9/2008
DE    10 2008 001 0    10/2009
(Continued)

*Primary Examiner* — Erick Solis
(74) *Attorney, Agent, or Firm* — Finnegan, Henderson, Farabow, Garrett & Dunner, LLP

(57) ABSTRACT

Provided is a control apparatus for an internal combustion engine, which can determine whether or not there is a failure concerning a switching of an operational state of an intake valve, in the internal combustion engine that includes a valve stop mechanism that is capable of switching the operational state of the intake valve between a valve operating state and a valve closed/stopped state, without the need of adding a new sensor for the failure determination. An intake variable valve operating apparatus (66) is provided that includes a valve stop mechanism capable of switching the operational state of the intake valve (62) between the valve operating state and the valve closed/stopped state. A crank angle sensor (72) is provided for detecting the crank angle of the internal combustion engine (12). An intake pressure sensor (56) is provided for detecting the actual intake pressure pim. It is determined whether or not there is a failure concerning the switching of the operational state of the intake valve (62) between the valve operating state and the valve closed/stopped state by the valve stop mechanism, based on an intake pressure difference dlpm (first difference) between the actual intake pressure pim and the pseudo intake pressure pmcrt at a predetermined crank angle (for example, 60° CA after the top dead center in each cylinder).

4 Claims, 10 Drawing Sheets

(51) Int. Cl.
  *F02D 13/02* (2006.01)
  *B60W 10/06* (2006.01)
  *F02D 41/12* (2006.01)
  *F01L 13/00* (2006.01)
  *F01L 1/18* (2006.01)
  *F01L 1/053* (2006.01)

(52) U.S. Cl.
  CPC ............... *F01L 1/18* (2013.01); *F01L 13/0005* (2013.01); *F01L 2001/0537* (2013.01); *F01L 2800/11* (2013.01); *F02D 13/02* (2013.01); *F02D 41/123* (2013.01); *F02D 2041/001* (2013.01); *F02D 2041/0012* (2013.01); *F02D 2200/0406* (2013.01); *F02D 2200/0408* (2013.01); *F02D 2200/703* (2013.01); *Y02T 10/18* (2013.01)

(56) References Cited

U.S. PATENT DOCUMENTS

| | | | |
|---|---|---|---|
| 7,634,940 B2 * | 12/2009 | Hartmann et al. | 73/114.37 |
| 7,921,709 B2 * | 4/2011 | Doering et al. | 73/114.79 |
| 8,141,541 B2 * | 3/2012 | Aso et al. | 123/436 |
| 8,336,374 B2 * | 12/2012 | Zanotti et al. | 73/114.79 |
| 2002/0035986 A1 | 3/2002 | Takagi et al. | |
| 2005/0204805 A1 | 9/2005 | Wakahara et al. | |
| 2008/0236267 A1 | 10/2008 | Hartmann et al. | |
| 2010/0175462 A1 * | 7/2010 | Doering et al. | 73/114.31 |
| 2010/0262355 A1 * | 10/2010 | Bauer et al. | 701/103 |
| 2011/0137509 A1 | 6/2011 | Sarac | |
| 2013/0325290 A1 * | 12/2013 | Pierik | 701/102 |

FOREIGN PATENT DOCUMENTS

| | | |
|---|---|---|
| JP | 4-159426 | 6/1992 |
| JP | 11-036960 | 2/1999 |
| JP | 2000-73792 | 3/2000 |
| JP | 2000-097973 | 4/2000 |
| JP | 2000-110594 | 4/2000 |
| JP | 2004-100486 | 4/2004 |
| JP | 2004-100487 | 4/2004 |
| JP | 2005-248825 | 9/2005 |
| JP | 2006-336566 | 12/2006 |
| JP | 2010-174857 | 8/2010 |
| JP | 2010-223019 | 10/2010 |

* cited by examiner

604: Is Atmospheric pressure arrival time period long (tstp_pa≧α)?

704: Is last stop time period larger than or equal to predetermined value (tstpl≧β)?

CONTROL APPARATUS FOR INTERNAL COMBUSTION ENGINE

CROSS-REFERENCE TO RELATED APPLICATIONS

This application is a national phase application of International Application No. PCT/JP2010/070579, filed Nov. 18, 2010, the content of which is incorporated herein by reference.

TECHNICAL FIELD

The present invention relates to a control apparatus for an internal combustion engine, and more particular to a control apparatus for an internal combustion engine that is suitable for determining whether or not there is a failure concerning a switching of an operational state of an intake valve, in the internal combustion engine that includes a valve stop mechanism that is capable of switching the operational state of the intake valve between a valve operating state and a valve closed/stopped state.

BACKGROUND ART

So far, for example, Patent Document 1 discloses a failure detecting device for an internal combustion engine that includes electromagnetically-driven type intake and exhaust valves. The conventional failure detecting device detects a failure of the intake and exhaust valves at the time of normal operation of the internal combustion engine in which the opening and closing of the intake and exhaust valves are being performed. More specifically, the aforementioned failure detecting device determines whether or not there is a failure of the intake valve being opened on the basis of the width of a change in an intake pipe pressure at a predetermined crank angle period, and determines whether or not there is a failure of the intake valve at a closed state or a failure of the exhaust valve being opened or closed, on the basis of the width of a change in an average value of the intake pipe pressure among cylinders.

Including the above described document, the applicant is aware of the following documents as related art of the present invention.

CITATION LIST

Patent Documents

Patent Document 1: Japanese Laid-open Patent Application Publication No. 2000-73792
Patent Document 2: Japanese Laid-open Patent Application Publication No. 2004-100487
Patent Document 3: Japanese Laid-open Patent Application Publication No. 2004-100486

SUMMARY OF INVENTION

Technical Problem

Also in an internal combustion engine that includes a valve stop mechanism which is capable of switching an operational state of an intake valve between a valve operating state and a closed/stopped state, it is desirable to be able to determine whether or not there is a failure concerning the operational state of the intake valve, without the need of newly providing a costly sensor, such as a lift amount sensor that is capable of detecting a lift amount of the intake valve.

The present invention has been made to solve the problem as described above, and has its object to provide a control apparatus for an internal combustion engine, which can determine whether or not there is a failure concerning a switching of an operational state of an intake valve, in the internal combustion engine that includes a valve stop mechanism that is capable of switching the operational state of the intake valve between a valve operating state and a valve closed/stopped state, without the need of adding a new sensor for the failure determination.

Solution to Problem

A first aspect of the present invention is a control apparatus for an internal combustion engine, comprising:
a valve stop mechanism that is capable of switching an operational state of an intake valve between a valve operating state and a valve closed/stopped state;
a crank angle sensor for detecting a crank angle of an internal combustion engine;
an intake pressure sensor for detecting an actual intake pressure;
pseudo intake pressure obtaining means for obtaining, based on an operational condition of the internal combustion engine, a pseudo intake pressure in a situation in which a switching of the operational state between the valve operating state and the valve closed/stopped state is normally performed; and
failure determination means that includes second failure determination means for determining whether or not there is a failure concerning the switching of the operational state of the intake valve between the valve operating state and the valve closed/stopped state by the valve stop mechanism, based on a second difference between the actual intake pressure and the pseudo intake pressure at a predetermined crank angle.

A second aspect of the present invention is the control apparatus for an internal combustion engine according to the first aspect of the present invention,
wherein the failure determination means includes first failure determination means for determining whether or not there is the failure concerning the switching of the operational state of the intake valve between the valve operating state and the valve closed/stopped state by the valve stop mechanism, based on a change amount of the actual intake pressure at a predetermined crank angle period.

A third aspect of the present invention is the control apparatus for an internal combustion engine according to the second aspect of the present invention,
wherein the first failure determination means determines whether or not there is a failure concerning the switching of the operational state of the intake valve between the valve operating state and the valve closed/stopped state by the valve stop mechanism, based on a first difference between the change amount of the actual intake pressure at the predetermined crank angle period and a change amount of the pseudo intake pressure at the predetermined crank angle period.

A fourth aspect of the present invention is the control apparatus for an internal combustion engine according to any one of the first to third aspects of the present invention,
wherein the control apparatus of the internal combustion engine further comprises atmospheric pressure obtaining means for obtaining an atmospheric pressure, and
wherein the failure determination means includes third failure determination means for determining whether or not there is a failure concerning a returning operation of the intake valve to switch the valve closed/stopped state to the valve operating state, based on a third difference between the actual intake pressure and the atmospheric pressure when a returning request to switch the valve closed/stopped state to the valve operating state for the intake valve has been issued.

A fifth aspect of the present invention is the control apparatus for an internal combustion engine according to any one of the first to fourth aspects of the present invention, wherein the failure determination means includes fourth failure determination means for, when a time period necessary for the actual intake pressure to arrive at the atmospheric air pressure is longer than or equal to a predetermined arrival time period determination value in a case in which a stopping request to switch the valve operating state to the valve closed/stopped state for the intake valve is present, determining that a failure concerning a stopping operation of the intake valve for switching the valve operating state to the valve closed/stopped state has occurred.

A sixth aspect of the present invention is the control apparatus for an internal combustion engine according to the third aspect of the present invention, wherein the control apparatus for an internal combustion engine further comprises cylinder discrimination means for discriminating a determination target cylinder that is subjected to failure determination, on a basis of the crank angle that is detected by the crank angle sensor, and wherein the failure determination means determines that a failure concerning a stopping operation of the intake valve for switching the valve operating state to the valve closed/stopped state has occurred at the determination target cylinder, when the second difference that is obtained by subtracting the actual intake pressure at the predetermined crank angle associated with the determination target cylinder from the pseudo intake pressure at the predetermined crank angle is larger than a predetermined second determination value, and the first difference that is obtained by subtracting the change amount of the actual intake pressure at the predetermined crank angle period associated with the determination target cylinder from the change amount of the pseudo intake pressure at the predetermined crank angle period is larger than a predetermined first determination value, in a case in which a stopping request to switch the valve operating state to the valve closed/stopped state for the intake valve is present.

A seventh aspect of the present invention is the control apparatus for an internal combustion engine according to the fourth or sixth aspect of the present invention, wherein the control apparatus for an internal combustion engine further comprises cylinder discrimination means for discriminating a determination target cylinder that is subjected to failure determination, on a basis of the crank angle that is detected by the crank angle sensor, and wherein the failure determination means determines that a failure concerning a returning operation of the intake valve for switching the valve closed/stopped state to the valve operating state has occurred at the determination target cylinder, when the third difference that is obtained by subtracting the actual intake pressure at the predetermined crank angle associated with the determination target cylinder from the atmospheric air pressure is smaller than a predetermined third determination value, and the first difference that is obtained by subtracting the change amount of the actual intake pressure at the predetermined crank angle period associated with the determination target cylinder from the change amount of the pseudo intake pressure at the predetermined crank angle period is smaller than a predetermined fourth determination value, in a case in which a returning request to switch the valve closed/stopped state to the valve operating state for the intake valve is present.

An eighth aspect of the present invention is the control apparatus for an internal combustion engine according to the third, sixth or seventh aspect of the present invention, wherein the control apparatus for an internal combustion engine further comprises cylinder discrimination means for discriminating a determination target cylinder that is subjected to failure determination, on a basis of the crank angle that is detected by the crank angle sensor, and wherein the failure determination means determines that a failure concerning a returning operation of the intake valve for switching the valve closed/stopped state to the valve operating state has occurred in the determination target cylinder, when the second difference that is obtained by subtracting the actual intake pressure at the predetermined crank angle associated with the determination target cylinder from the pseudo intake pressure at the predetermined crank angle is larger than a predetermined fifth determination value, and the first difference that is obtained by subtracting the change amount of the actual intake pressure at the predetermined crank angle period associated with the determination target cylinder from the change amount of the pseudo intake pressure at the predetermined crank angle period is smaller than a predetermined sixth determination value, in a case in which a returning request to switch the valve closed/stopped state to the valve operating state for the intake valve is present.

Advantageous Effects of Invention

When a failure has occurred in the switching of the operational state of the intake valve between the valve operating state and the valve closed/stopped state, the difference is produced between the actual intake pressure and the aforementioned pseudo intake pressure. According to the first aspect of the present invention, it can be therefore determined whether or not there is the failure by performing the determination of using the second difference between the actual intake pressure and the pseudo intake pressure at a predetermined crank angle, without the need of adding a new sensor for the failure determination.

According to the second aspect of the present invention, a cylinder at which the aforementioned failure of the intake valve has occurred can be identified by performing the determination of using the change amount of the actual intake pressure at a predetermined crank angle period.

According to the third aspect of the present invention, the determination of the failure using a large value is allowed as compared with a case of only using the change amount of the actual intake pressure at the predetermined crank angle period. This makes it possible to improve the accuracy of determination of the aforementioned failure.

When a failure of the intake valve has occurred in the returning operation, after the returning request the difference between the atmospheric pressure and the actual intake pressure is not produced or becomes small even if it has been produced. According to the fourth aspect of the present invention, it can be determined whether or not there is a failure of the returning operation of the intake valve by performing the determination of using the third difference between the actual intake pressure and the atmospheric pressure.

When the stopping operation of the intake valve is not normally performed at the time of the stopping request for the intake valve, the actual intake pressure does not rise to a value near the atmospheric pressure even when a time period has elapsed that is required for the actual intake pressure to arrive at a value near the atmospheric pressure if the stopping operation of the intake valve is normally performed. According to the fifth aspect of the present invention, when the stopping request has been issued, it can be determined that a failure concerning the stopping operation of the intake valve has occurred by determining whether or not the time period until the actual intake pressure arrives at the atmospheric pressure is longer than or equal to a predetermined arrival time period determination value.

When the stopping request for the intake valve has been issued, the sixth aspect of the present invention makes it possible to accurately determine a cylinder at which a failure concerning the stopping operation of the intake valve has occurred.

When the returning request for the intake valve has been issued, the seventh to eighth aspects of the present invention make it possible to accurately determine a cylinder at which a failure concerning the returning operation of the intake valve has occurred.

DESCRIPTION OF EMBODIMENT

First Embodiment

Configuration of HV System

Figure 1:
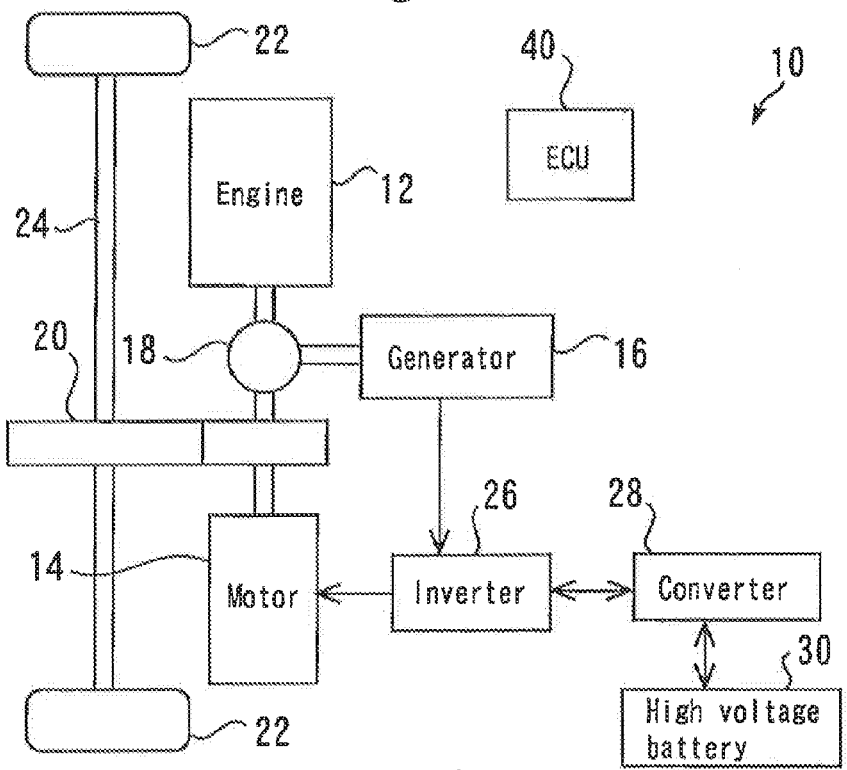
FIG. 1 is a diagram to show an outline configuration of a drive system of a hybrid vehicle to which the present invention is applied.

FIG. 1 is a diagram to show an outline configuration of a drive system 10 of a hybrid vehicle to which the present invention is applied. This drive system 10 includes a motor for driving the vehicle (hereafter, simply referred to as a "motor") 14 as the second power source for the vehicle in addition to an internal combustion engine 12. In addition, the drive system 10 also includes a generator 16 that receives the supply of a driving force to generate electric power. The internal combustion engine 12, the motor 14 and the generator 16 are interlinked via a power split mechanism 18 of a planetary gear type. A speed reducer 20 is connected to the rotating shaft of the motor 14 in connection with the power split mechanism 18. The speed reducer 20 links the rotating shaft of the motor 14 with a driving shaft 24 which leads to driving wheels 22. The power split mechanism 18 is an apparatus to split the driving force of the internal combustion engine 12 into the generator 16 side and the speed reducer 20 side. The distribution of the driving force by the power split mechanism 18 can be freely changed.

The drive system 10 further includes an inverter 26, a converter 28 and a high voltage battery 30. The inverter 26 is connected to the generator 16 and the motor 14, and is also connected to the high voltage battery 30 via the converter 28. The electric power generated at the generator 16 can be supplied to the motor 14 via the inverter 26, and also can be charged to the high voltage battery 30 via the inverter 26 and the converter 28. Moreover, the electric power charged in the high voltage battery 30 can be supplied to the motor 14 via the converter 28 and the inverter 26.

According to the drive system 10 as so far described, based on a predetermined condition the driving wheels 22 can be rotated by the driving force of the internal combustion engine 12 alone with the motor 14 being deactivated, and conversely the driving wheels 22 can be rotated by the driving force of the motor 14 alone with the internal combustion engine 12 being deactivated. Moreover, it is also possible to activate both of the motor 14 and the internal combustion engine 12 and to rotate the driving wheels 22 by both of the driving forces. Further, the generator 16 is allowed to function as a starter to drive the internal combustion engine 12, and thereby, the start up of the internal combustion engine 12 can be controlled.

The drive system 10 of the present embodiment is controlled by an ECU (Electronic Control Unit) 40. The ECU 40 comprehensively controls the entire drive system 10 including the internal combustion engine 12, the motor 14, the generator 16, the power split mechanism 18, the inverter 26, the converter 28 and the like.

[System Configuration of Internal Combustion Engine]

Figure 2:
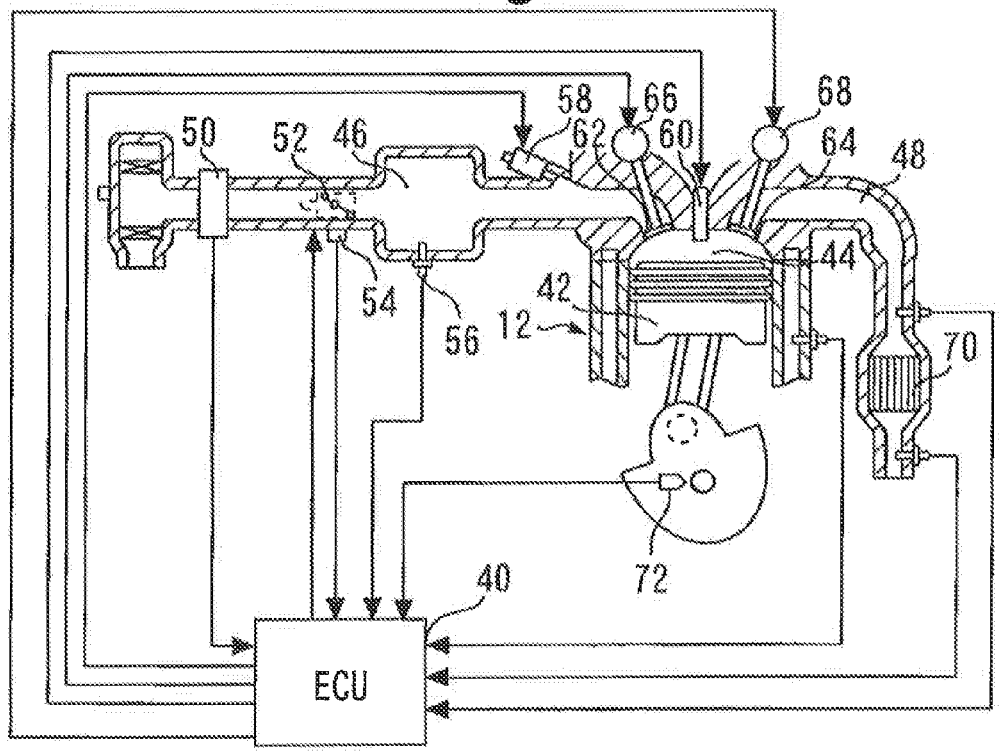
FIG. 2 is a diagram for explaining the system configuration of an internal combustion engine shown in FIG. 1.

FIG. 2 is a diagram for explaining the system configuration of the internal combustion engine 12 shown in FIG. 1. Here, the internal combustion engine 12 is supposed to be a straight four-cylinder engine which includes four cylinders (#1 to #4) and in which explosion strokes are performed at uniform intervals in the order (for example) of #1 to #3, to #4, and to #2. Each of cylinders of the internal combustion engine 12 contains a piston 42. Each of the cylinders of the internal combustion engine 12 has a combustion chamber 44 formed atop the piston 42. An intake passage 46 and an exhaust passage 48 are communicated with the combustion chamber 44.

An air flow meter 50 is installed in the vicinity of the inlet of the intake passage 46 to output a signal representing the flow rate of the air taken into the intake passage 46. A throttle valve 52 is installed downstream of the air flow meter 50. The throttle valve 52 is an electronically controlled throttle valve that can control an opening degree of the throttle valve independently of a press-down degree of an accelerator. A throttle valve position sensor 54 for detecting the throttle valve opening degree is disposed in the vicinity of the throttle valve 52.

An intake pressure sensor 56 for detecting an intake pressure is disposed downstream with respect to the throttle valve 52, more specifically, the integral part of an intake manifold of the intake passage 14. In addition, a fuel injection valve 58 for injecting a fuel into an intake port of the internal combustion engine 12 is disposed downstream with respect to the intake pressure sensor 56. At a cylinder head of the internal combustion engine 12, an ignition plug 60 is mounted in such a form as to project from an upper section of the combustion chamber 44 into the combustion chamber 44. An intake valve 62 and an exhaust valve 64 are provided at the intake port and an exhaust port, respectively. The intake valve 62 establishes continuity or discontinuity between the combustion chamber 44 and the intake passage 46, and the exhaust valve 64 establishes continuity or discontinuity between the combustion chamber 44 and the exhaust passage 48.

The intake valve 62 and the exhaust valve 64 are driven by an intake variable valve operating apparatus 66 and an exhaust variable valve operating apparatus 68, respectively. It is assumed that the intake variable valve operating apparatus 66 includes a valve stop mechanism (not shown) that is capable of switching the operational state of the intake valve 62 between the valve operating state and the valve closed/stopped state for each cylinder, and similarly, the exhaust variable valve operating apparatus 68 includes a valve stop mechanism (not shown) that is capable of switching the operational state of the exhaust valve 64 between the valve operating state and the valve closed/stopped state for each cylinder. The concrete configurations of the aforementioned valve stop mechanisms are not specifically limited, and can be realized by means of for example, a configuration that is capable of halting a rocking action of a rocker arm that transmits an acting force of a cam to a valve using a switching pin.

Furthermore, a catalyst 70 for purifying exhaust gas is disposed in the exhaust passage 48. Moreover, an input section of the aforementioned ECU 40 is connected with various types of sensors for detecting the operating state of the internal combustion engine 12, such as a crank angle sensor 72 for detecting a crank angle and an engine speed (crank angular velocity), as well as the air flow meter 50, the throttle valve position sensor 54 and the intake pressure sensor 56 that are described above. Furthermore, an output section of the ECU 40 is connected with various types of actuators for controlling the internal combustion engine 12 as well as the throttle valve 52, the fuel injection valve 58, the ignition plug 60, the intake variable valve operating apparatus 66 and the exhaust variable valve operating apparatus 68 that are described above. The ECU 40 can control the operating state of the internal combustion engine 12 on the basis of outputs of those sensors.

If fresh air that has a high oxygen concentration is supplied into the catalyst 70 in a case in which the catalyst 70 that is disposed in the exhaust passage 48 is in a high temperature state, there is a concern that deterioration of the catalyst 70 will arise. In order to suppress the deterioration of the catalyst 70, it is effective to prevent the oxygen from flowing into the catalyst 70. According to the system of the present embodiment that includes the aforementioned variable valve operating apparatuses 66 and 68, when a request to execute a fuel cut (F/C) has been issued at the time of deceleration, high engine speed or the like, the operational state of at least one of the intake valve 62 and the exhaust valve 64 in all cylinders is switched to the valve closed/stopped state from the valve operating state in synchronization with the fuel cut, and thereby, the oxygen can be prevented from flowing into the catalyst 70 during the fuel cut. This makes it possible to suppress the deterioration of the catalyst 70.

[Determination Methods of Stopping Failure and Returning Failure of Intake Valve in First Embodiment]

Hereinafter, a method for determining whether or not there is a failure concerning a switching of the operational state of the intake valve 62 between the valve operating state and the valve closed/stopped state will be described with reference to FIGS. 3 to 5. More specifically, when a request to execute a fuel cut that is accompanied by a stopping request to switch the valve operating state to the valve closed/stopped state for the intake valve 62 has been issued, the present embodiment performs a determination as to whether or not there is a failure concerning a stopping operation of the intake valve 62 for switching the valve operating state to the valve closed/stopped state, that is to say, a failure (hereinafter, simply referred to as a "stopping failure" in some cases) in which a switching toward the valve closed/stopped state is not normally performed in synchronization with the fuel cut, by use of a method that is described below with reference to FIGS. 3 and 4. In addition, when a returning request from a fuel cut that is accompanied by a returning request to switch the valve closed/stopped state to the valve operating state for the intake valve 62 has been issued, the present embodiment performs a determination as to whether or not there is a failure concerning a returning operation of the intake valve 62 for switching the valve closed/stopped state to the valve operating state, that is to say, a failure (hereinafter, simply referred to as a "returning failure" in some cases) in which a switching toward the valve operating state is not normally performed in synchronization with the returning from the fuel cut, has occurred, by use of a method that is described below with reference to FIG. 5. In this connection, the following description is assumed to be made by taking an example of a situation in which a stopping request and a returning request are issued with respect to the intake valves in a plurality of cylinders that shares an intake manifold of an intake passage (in the internal combustion engine 12 of the present embodiment, all cylinders of #1 to #4 correspond to them).

(Determination of Stopping Failure of Intake Valve)

Figure 3:
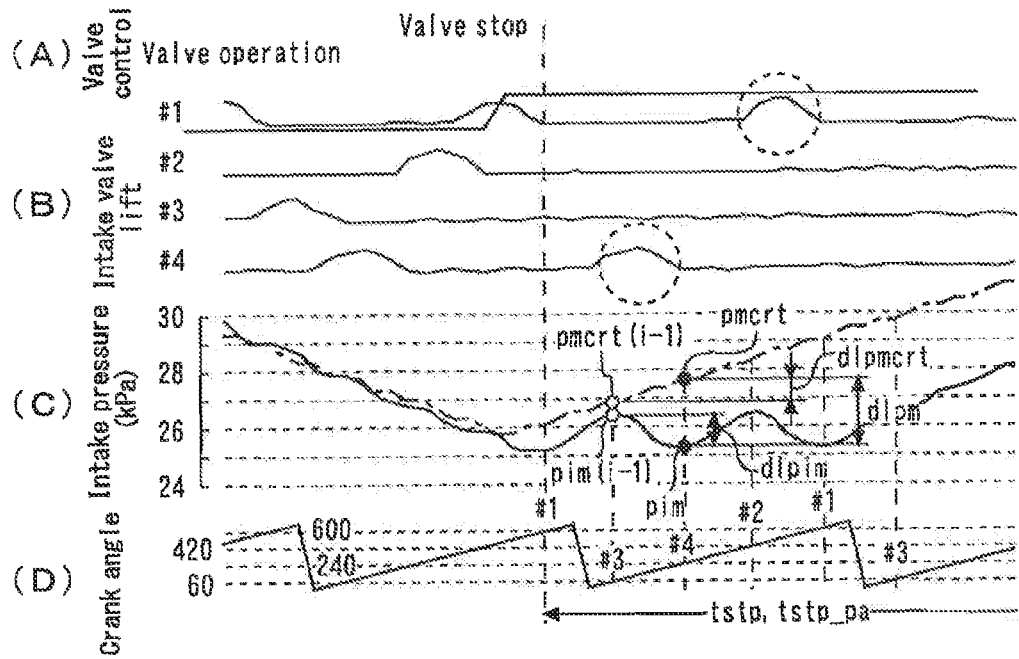
FIG. 3 is a diagram for explaining a determination method of a stopping failure of an intake valve by use of a case in which an one-cycle delay of a stopping operation of the intake valve has occurred at #1 and #4 cylinders.
Figure 4:
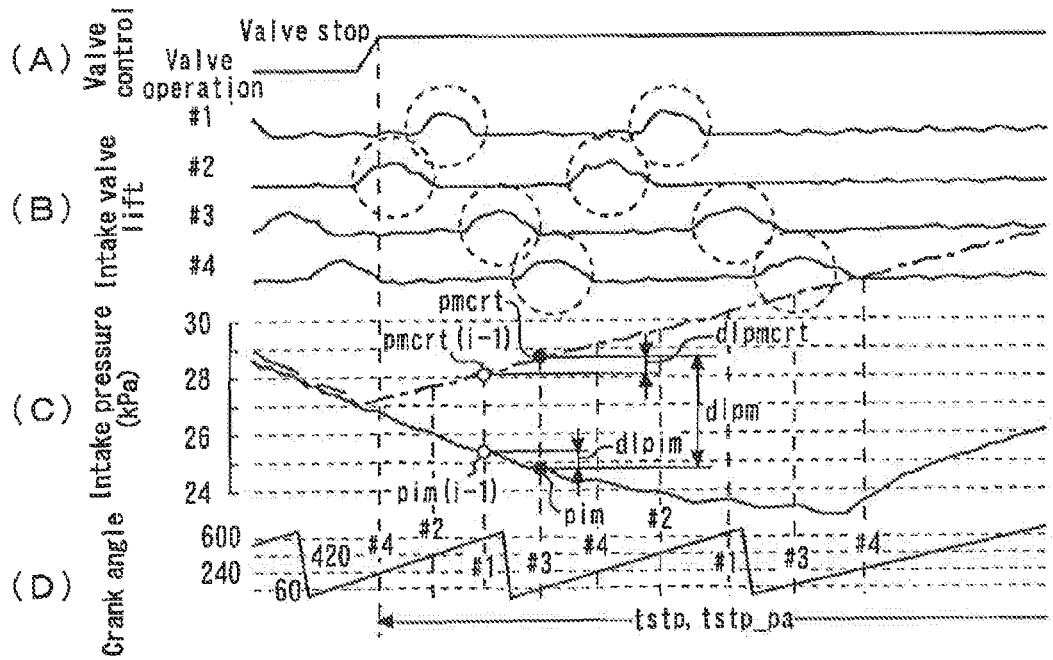
FIG. 4 is a diagram for explaining a determination method of the stopping failure of the intake valve by use of a case in which two-cycle delays of the stopping operations of the intake valves have occurred at all of the cylinders.

FIG. 3 is a diagram for explaining a determination method of the stopping failure of the intake valve 62 by use of a case in which an one-cycle delay of the stopping operation of the intake valve 62 has occurred at #1 and #4 cylinders, and FIG. 4 is a diagram for explaining a determination method of the stopping failure of the intake valve 62 by use of a case in which two-cycle delays of the stopping operations of the intake valves 62 have occurred at all of the cylinders. More specifically, FIGS. 3 and 4 are diagrams representing the operation of the internal combustion engine 12 before and after execution of a fuel cut that is accompanied by the stopping operations of the intake valves 62 in all of the cylinders at the time of deceleration. In addition, the waveforms represented by the solid lines in FIGS. 3(C) and 4(C) (the same as FIG. 5(C)) correspond to an actual intake pressure pim, and the waveforms represented by the one-dot chain lines in the same figures correspond to a pseudo intake pressure pmcrt. The pseudo intake pressure pmcrt is a value that is calculated on the basis of the operating condition of the internal combustion engine 12 (herein, the engine speed and the throttle valve opening degree), and corresponds to a value (estimated value) that is equivalent to the actual intake pressure pim in a case in which the stopping operation or the returning operation of the intake valve 62 has been normally performed in each cylinder. In this connection, in FIGS. 3 and 4 (the same as FIG. 5), the crank angle when the piston 42 in #1 cylinder is located at the compression top dead center corresponds to 0° CA. Furthermore, in FIGS. 3 and 4 (the same as FIG. 5), the acquisition timing of the actual intake pressure pim and the pseudo intake pressure pmcrt correspond to 60° CA after the top dead center in each cylinder, which is a timing at which the intake pressure pulsation for every cylinder shows a peak value.

As shown in FIGS. 3(C) and 4(C), the actual intake pressure pim in a case in which the intake valve 62 is in operation at the time of deceleration is gradually decreasing (increasing in terms of negative pressure) because the throttle valve 52 is in the closed state. If under such a situation the stopping operation of the intake valve 62 of each cylinder has been normally performed, the flow of intake gas stops, and therefore, the actual intake pressure pim increases toward the atmospheric pressure pa as in the pseudo intake pressure pmcrt. If, on the other hand, the stopping failure of the intake valve 62 has occurred as shown in FIGS. 3 and 4, the flow of the intake gas is generated through a cylinder at which the stopping failure has occurred, and therefore, the actual intake pressure pim decreases. More specifically, if it is a ease where the cylinders at which the stopping failure has occurred are intermittently present as shown in FIG. 3: the actual intake pressure pim increases in the intake stroke of #3 cylinder at which the stopping operation is being normally performed because the intake gas does not flow; then, the actual intake pressure pim decreases in the intake stroke of #1 cylinder at which the failure has occurred because the intake gas flows; then, the actual intake pressure pim increases again in the intake stroke of #2 cylinder that is normal; and then, the actual intake pressure pim decreases again in the intake stroke of #4 cylinder at which the failure has occurred because the intake gas does not flow. In addition, if it is a case where the stopping failure has occurred continuously in all cylinders as shown in FIG. 4, the actual intake pressure pim decreases in succession in two cycles during which the stopping failure has occurred.

Accordingly, in the present embodiment, the stopping failure of the intake valve 62 is detected, and further, a cylinder at which the stopping failure has occurred is identified, by use of the following method. More specifically, the pseudo intake pressure pmcrt calculated on the basis of the operating condition as described above represents a value equivalent to the actual intake pressure pim at the normal state, and therefore, an intake pressure difference dlpm between the actual intake pressure pim and the pseudo intake pressure pmcrt increases when the stopping failure has occurred. Thus, in the present embodiment, a determination of the stopping failure of the intake valve 62 based on the intake pressure difference dlpm is performed.

In addition, as depicted well in FIG. 3, the actual intake pressure pim increases and decreases in synchronization with the intake strokes of the normal cylinder and the failure cylinder (that is, for every 180° CA in the four-cylinder engine as in the internal combustion engine 12). As a result of this, a change amount dlpim (the current value pim–the last value pim(i–1)) of the actual intake pressure pim at 240° CA after the intake top dead center (a timing near the closing timing of the intake valve) in each cylinder becomes a negative value if the intake stroke transitions to the failure cylinder from the normal cylinder, and on the contrary, becomes a positive value if the intake stroke transitions to the normal cylinder from the failure cylinder. Because of this, a cylinder at which the stopping failure has occurred can be identified on the basis of the actual intake pressure change amount dlpim.

Further, a change amount dlpmcrt (pmcrt–pmcrt(i–1)) of the pseudo intake pressure pmcrt during the stopping operation of the intake valve 62 becomes a positive value during a period in which the pseudo intake pressure pmcrt is rising toward the atmospheric pressure pa. As a result of this, ddlpm (dlpmcrt–dlpim), which is the difference between these two change amounts, becomes a large positive value because when the intake stroke transitions to the failure cylinder from the normal cylinder, the difference between the positive value dlpmcrt and the negative value dlpim corresponds to it, and on the other hand, becomes a value close to zero because when the intake stroke transitions to the normal cylinder from the failure cylinder, the difference between the positive value dlpmcrt and the positive value dlpim corresponds to it. The determination of the failure using a large value (nearly double) is therefore allowed in a case of using the intake pressure change amount difference ddlpm when identifying a cylinder at which the stopping failure has occurred, as compared with a case of using the actual intake pressure change amount dlpim. Accordingly, in the present embodiment, the determination of the stopping failure of the intake valve 62 based on the intake pressure change amount difference ddlpm is also performed as well as the determination of the stopping failure of the intake valve 62 based on the intake pressure difference dlpm.

Further, in a case in which the number of stopping delay cycles of the intake valve 62 is large, the actual intake pressure pim does not rise to a value near the atmospheric pressure pa even when a time period has elapsed that is necessary for the actual intake pressure pim to arrive at a value near the atmospheric pressure pa if the stopping operation of the intake valve 62 has been normally performed. Therefore, the present embodiment further determines that the stopping failure of the intake valve 62 has occurred at any of cylinders if a rise time period tstp_pa of the actual intake pressure pim from a time point at which a stopping request for the intake valve 62 has been issued is longer than or equal to a predetermined arrival time period determination value α (a time period necessary for the actual intake pressure pim to arrive at the atmospheric pressure pa if the stopping operation of the intake valve 62 is normal).

(Determination of Returning Failure of Intake Valve)

Figure 5:
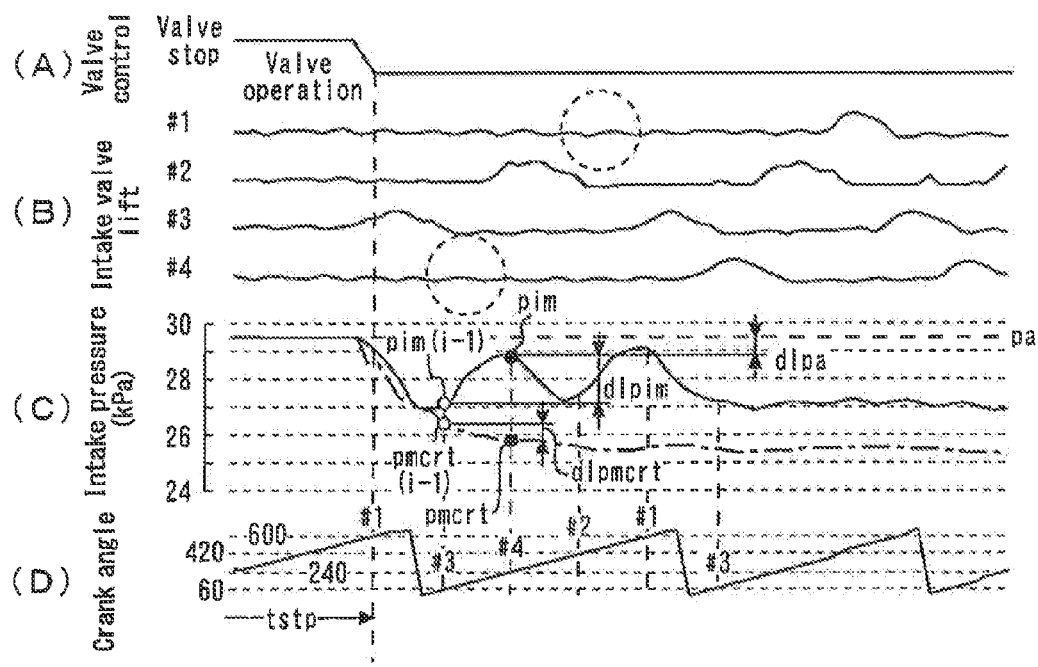
FIG. 5 is a diagram for explaining a determination method of a returning failure of the intake valve with reference to a case in which an one-cycle delay of a returning operation of the intake valve has occurred at #1 and #4 cylinders.

FIG. 5 is a diagram for explaining a determination method of the returning failure of the intake valve 62 with reference to a case in which an one-cycle delay of the returning operation of the intake valve 62 has occurred at #1 and #4 cylinders.

When a stopping time period tstp of the intake valve 62 is longer than or equal to a predetermined time period, the actual intake pressure pim arrives at the atmospheric pressure pa during a period in which the stopping operation of the intake valve 62 continues. If the returning operation of the intake valve 62 of each cylinder has been normally performed under such a situation, the intake gas starts to flow, and as a result, the actual intake pressure pim decreases as in the pseudo intake pressure pmcrt in FIG. 5. If on the other hand, the returning failure of the intake valve 62 has occurred, the intake gas does not flow, and as a result, the actual intake pressure pim holds a value near the atmospheric pressure pa or rises again, as shown in FIG. 5.

Accordingly, in the present embodiment, the determination of the returning failure of the intake valve 62 is performed on the basis of the intake pressure change amount difference ddlpm when a returning request for the intake valve 62 has been issued, in the same manner as when the above described stopping request has been issued. Specifically, as shown in FIG. 5, the pseudo intake pressure change amount dlpmcrt becomes a negative value in the course of the actual intake pressure pim decreasing after the returning request, and approaches nearly zero after that. In contrast, as shown in FIG. 5, the actual intake pressure change amount dlpim becomes a positive value because the actual intake pressure pim increases if the intake stroke transitions to the failure cylinder from the normal cylinder, and conversely, becomes a negative value because the actual intake pressure pim decreases if the intake stroke transitions to the normal cylinder from the failure cylinder. Thus, a cylinder at which the returning failure has occurred can be identified on the basis of the actual intake pressure change amount dlpim. On that basis, the intake pressure change amount difference ddlpm becomes a large negative value because the difference between the negative value dlpmcrt and the positive value dlpim corresponds to it if the intake stroke transitions to the failure cylinder from the normal cylinder, and on the other hand, becomes a value near zero because the difference between the negative value dlpmcrt and the negative value dlpim corresponds to it if the intake stroke transitions to the normal cylinder from the failure cylinder. Therefore, also when identifying a cylinder at which the returning failure has occurred, the determination of the failure by use of a large value (nearly double) can be performed in a case of using the intake pressure change amount difference ddlpm, as compared with a case of using the actual intake pressure change amount dlpim.

Further, when the retuning failure of the intake valve 62 has occurred, the actual intake pressure pim becomes a value near the atmospheric pressure pa. In the present embodiment, the further determination of the returning failure of the intake valve 62 is performed on the basis of a pressure difference dlpa (pa−pim) between the atmospheric pressure pa and the actual intake pressure pint.

[Concrete Processing in First Embodiment]

Hereinafter, the concrete processing that is executed by the ECU 40 to determine whether or not there are the stopping failure and the returning failure of the intake valve 62 that are described above will be described with reference to FIGS. 6 to 13.

Figure 6:
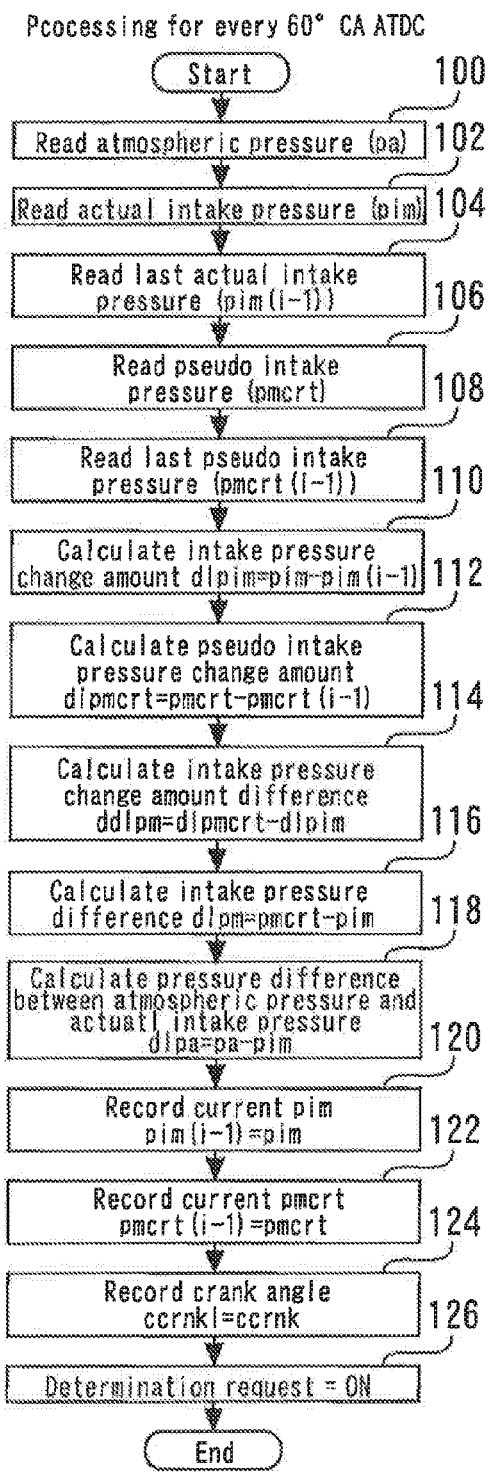
FIG. 6 is a flowchart that represents a routine to process a data used for the determination of the failure of the intake valve.

First, FIG. 6 is a flowchart that represents a routine to process a data used for the determination of the failure of the intake valve 62. The routine shown in FIG. 6 is to be repeatedly executed for every 60° CA after the top dead center in each cylinder.

According to the routine shown in FIG. 6, first, the atmospheric pressure pa is read (step 100). The atmospheric pressure pa is always obtained and updated by use of the intake pressure sensor 56 during a stop of the internal combustion engine 12 or an operation in which the throttle valve opening degree is being fully opened, in accordance with a routine that is different from the present routine. According to such manner, the atmospheric pressure can be obtained without including an atmospheric pressure sensor separately.

Next, the current actual intake pressure pim obtained by use of the intake pressure sensor 56 is read (step 102), the actual intake pressure pim (i−1) of the last cycle (that is, at the crank an angle advanced by 180° CA) is read (step 104, the pseudo intake pressure pmcrt obtained by the processing of the routine shown in FIG. 7 described later is read (stop 106), and the pseudo intake pressure pmcrt of the last cycle (that is, at the crank an angle advanced by 180° CA) is read (step 108).

Next, the actual intake pressure change amount dlpim (=the current value pim−the last value pim (i−1)) is calculated (step 110), the pseudo intake pressure change amount dlpmcrt (=the current value pmcrt−the last value pmcrt (i−1)) is calculated (step 112), the intake pressure change amount difference ddlpm (=dlpmcrt−dlpim) is calculated (step 114), the intake pressure difference dlpm (pmcrt−pim) is calculated (step 116), and the pressure difference dlpa (=pa−pim) between the atmospheric pressure pa and the actual intake pressure pim is calculated (step 118).

Next, the current actual intake pressure pim is recorded (step 120), the current pseudo intake pressure pmcrt is recorded (step 122), and the current crank angle ccrnk is recorded (step 124). Then, a determination request for the stopping failure and the returning failure of the intake valve 62 is turned ON (step 126).

Figure 7:
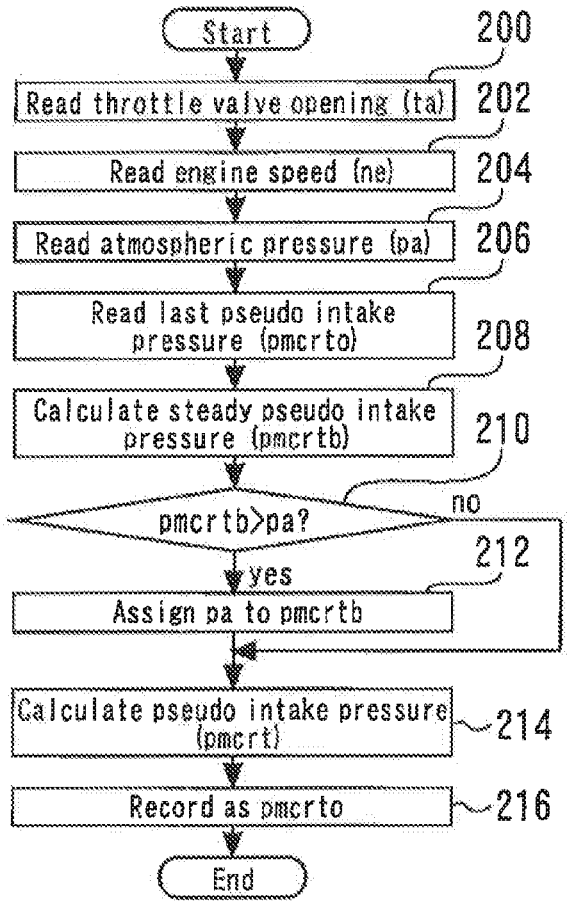
FIG. 7 is a flowchart that represents a calculation processing routine of a pseudo intake pressure pmcrt.

Next, FIG. 7 is a flowchart that represents a calculation processing routine of the pseudo intake pressure pmcrt.

According to the routine shown in FIG. 7, first, the current throttle valve opening degree ta detected by use of the throttle position sensor 54 is read (step 200), the current engine speed ne detected by use of the crank angle sensor 72 is read (step 202), and the atmospheric pressure pa is read by means of the same processing as that of aforementioned step 100 (step 204).

Figure 8:
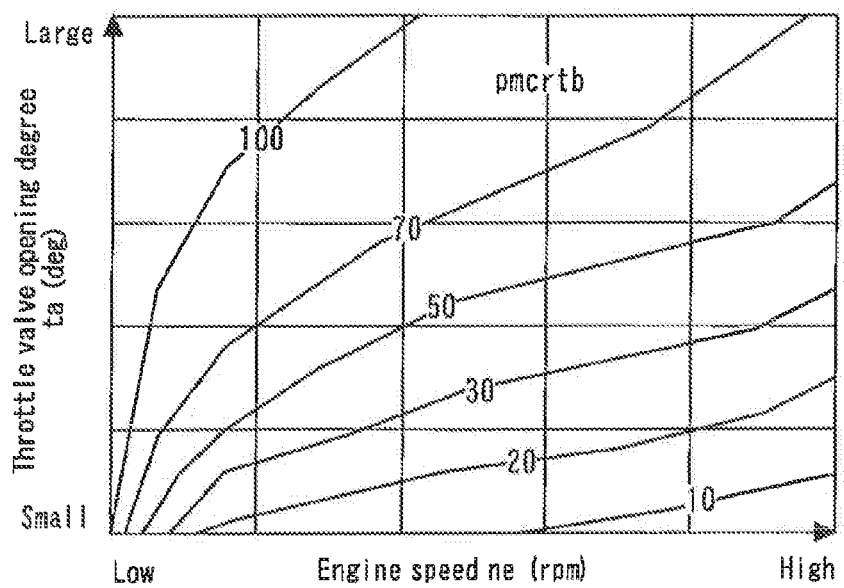
FIG. 8 is a diagram that represents a map that defines the pseudo intake pressure pmcrtb at the steady state with a relation with a throttle valve opening degree ta and an engine speed ne.

Next, the last pseudo intake pressure pmcrt is read (step 206). The pseudo intake pressure pmcrtb at the steady state is then calculated (step 208), FIG. 8 is a diagram that represents a map that defines the pseudo intake pressure pmcrtb at the steady state with a relation with the throttle valve opening degree ta and the engine speed ne. In present step 208, the pseudo intake pressure pmcrtb at the steady state is calculated on the basis of the throttle valve opening degree ta and the engine speed ne, in accordance with a map as shown in FIG. 8.

Next, it is determined whether or not the pseudo intake pressure pmcrtb at the steady state is higher than the atmospheric pressure pa (step 210). As a result of this, if it is determined that the pseudo intake, pressure pmcrtb at the steady state is higher than the atmospheric pressure pa, the atmospheric pressure pa is assigned to the current pseudo intake pressure pmcrtb at the steady state (step 212).

If, on the other hand, the pseudo intake pressure pmcrtb at the steady state is determined to be lower than or equal to the atmospheric pressure pa, the smoothing process is executed with respect to the change amount between the last pseudo intake pressure pmcrto and the pseudo intake pressure pmcrtb at the steady state that is calculated in aforementioned step 208, and then, the current pseudo intake pressure pmcrt is calculated (step 214). For the sake of the next start-up of the routine, the pseudo intake pressure pmcrt that is currently calculated is recorded as the last pseudo intake pressure pmcrto (step 216).

Figure 9:
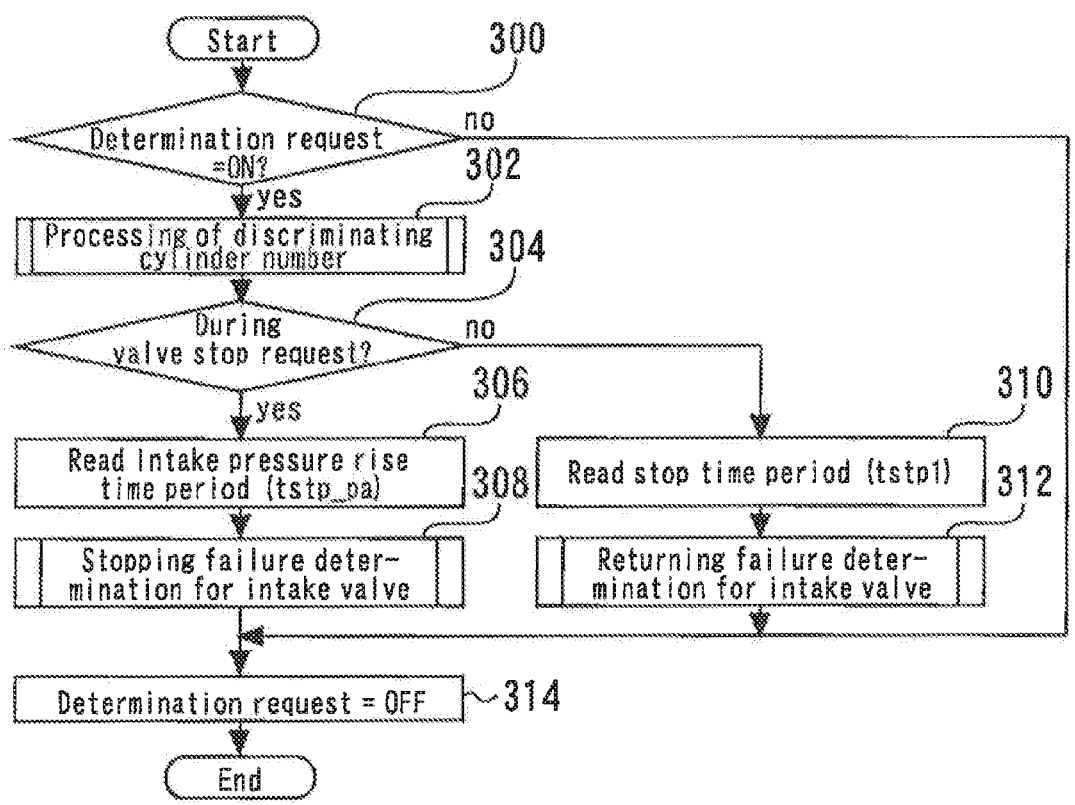
FIG. 9 is a flowchart that represents a main routine of the failure determination processing for the intake valve according to the first embodiment of the present invention.

Next, FIG. 9 is a flowchart that represents a main routine of the failure determination processing for the intake valve 62 according to the first embodiment of the present invention.

In the routine shown in FIG. 9, first, it is determined whether or not the determination request for the stopping failure and the returning failure of intake valve 62 is in the ON state (step 300). As a result of this, if it is determined that the determination request is in the ON state, the processing to discriminate the cylinder number is performed in accordance with the routine shown in FIG. 10.

Figure 10:
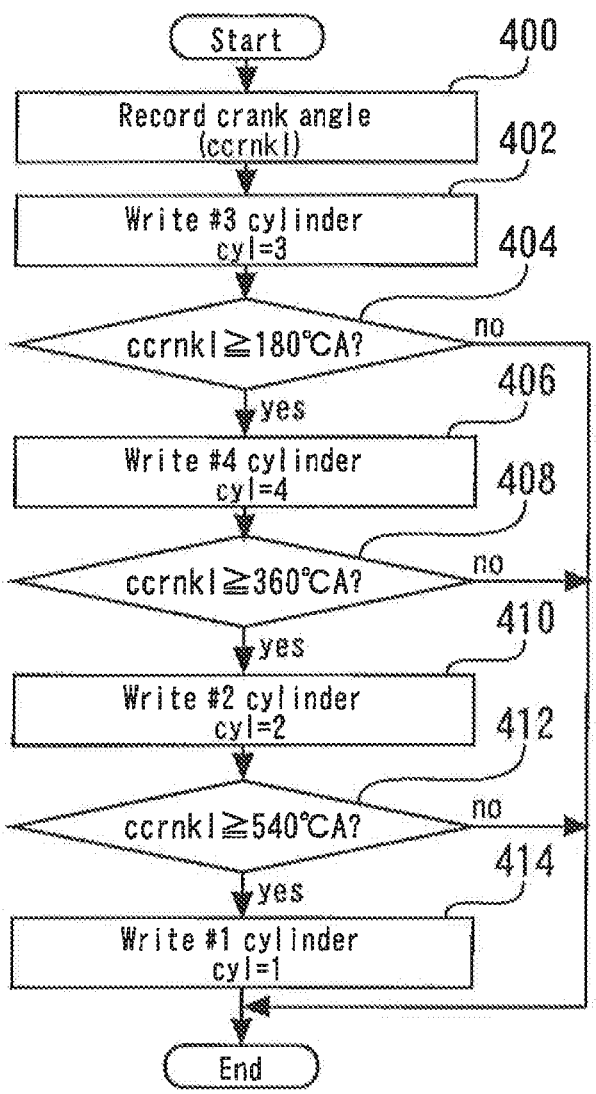
FIG. 10 is a flowchart that represents the routine of processing to discriminate the cylinder number that is subjected to the failure determination of the intake valve at the time of start-up of the main routine.

FIG. 10 is a flowchart that represents the routine of processing to discriminate the cylinder number that is subjected to the failure determination of the intake valve 62 at the time of start-up of the main routine.

According to the routine shown in FIG. 10, first, the crank angle ccrnkl recorded in aforementioned step 124 is read (step 400). Then, #3 cylinder is written (step 402).

Next, it is determined whether or not the crank angle ccrnkl read in aforementioned step 400 is larger than or equal to 180° CA (step 404). As a result of this, if the present determination is negative, that is to say, if the aforementioned crank angle ccrnkl is within 0 to 179° CA, the current cycle of the processing is ended. Thus, in this case, #3 cylinder written in aforementioned step 402 is discriminated as the determination target cylinder that is subjected to the current failure determination.

If, on the other hand, the determination of aforementioned step 404 is positive, #4 cylinder is written (step 406). It is then determined whether or not the crank angle ccrnkl read in aforementioned step 400 is larger than or equal to 360° CA (step 408). As a result of this, if the present determination is negative, that is to say, if the aforementioned crank angle ccrnkl is within 180 to 359° CA, the current cycle of the processing is ended. Thus, in this case, #4 cylinder written in aforementioned step 406 is discriminated as the determination target cylinder.

In addition, the determination of aforementioned step 408 is positive, #2 cylinder is written (step 410). It is then determined whether or not the crank angle ccrnkl read in aforementioned step 400 is larger than or equal to 540° CA (step 412). As a result Of this, if the present determination is negative, that is to say, if the aforementioned crank angle ccrnkl is within 360 to 539° CA, the current cycle of the processing is ended. Thus, in this case, #2 cylinder written in aforementioned step 410 is discriminated as the determination target cylinder.

In addition, if the determination of aforementioned step 412 is positive, #1 cylinder is written (step 414), and the current cycle of the processing is ended. Thus, in this case, #1 cylinder written in aforementioned step 414 is discriminated as the determination target cylinder.

The routine shown in FIG. 9 will be described again. According to the routine shown in FIG. 9, if the current determination target cylinder has been discriminated in aforementioned step 302 in accordance with the processing of the aforementioned routine shown in FIG. 10, it is then determined whether or not the stopping request for the intake valve 62 is present (step 304). The stopping request for the intake valve 62 is issued when a predetermined execution condition of the stopping operation of the intake valve 62, such as the temperature of the catalyst 70 is higher than or equal to a predetermined temperature and a request to execute a fuel cut has been issued, is established.

Figure 11:
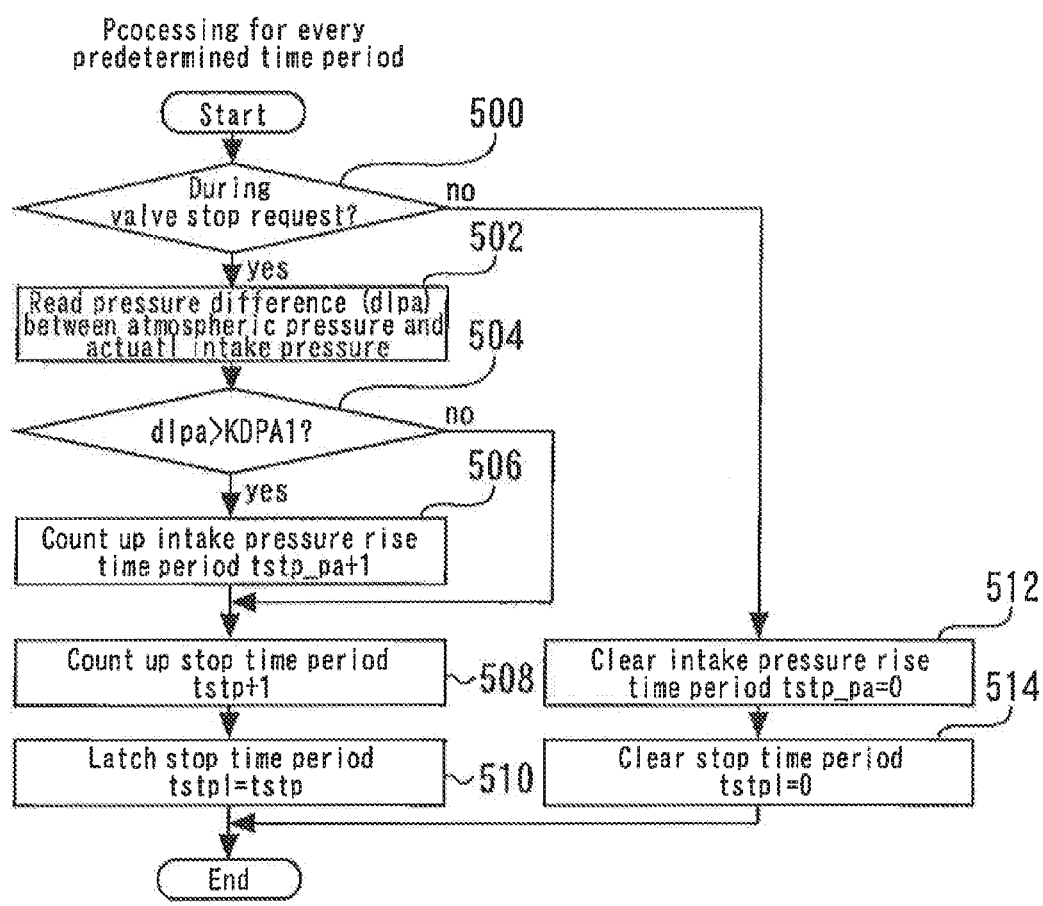
FIG. 11 is a flowchart that represents the routine of processing to count up an intake pressure rise time period tstp_pa and a stopping time period tstpl.

If it is determined in aforementioned step 304 that the stopping request for the intake valve 62 is present, the intake pressure rise time period tstp_pa calculated by the processing of the routine shown in FIG. 11 is read (step 306).

FIG. 11 is a flowchart that represents the routine of processing to count up the intake pressure rise time period tstp_pa and the stopping time period tstpl. The present routine is executed periodically at predetermined intervals.

According to the routine shown in FIG. 11, first, it is determined whether or not the stopping request for the intake valve 62 is present by use of the same processing as that in aforementioned step 304. (step 500).

If it is determined in aforementioned step 500 that the stopping request for the intake valve 62 is present, the pressure difference dlpa (the value calculated by the processing in aforementioned step 118) between the atmospheric pressure pa and the actual intake pressure pim is read (step 502). Then, it is determined whether or not the pressure difference dlpa is higher than a predetermined determination value KDPA1 (step 504).

If the determination of aforementioned step 504 is positive, it can be judged that since the actual intake pressure pim is away from the atmospheric pressure pa, the actual intake pressure pim is in a situation of increasing toward the atmospheric pressure pa, provided that the stopping operation of the intake valve 62 is normally performed. Because of this, in this case, the intake pressure rise time period tstp_pa is counted up (step 506), and the stopping time period tstp that is an elapsed time period from a time point at which the stopping request for the intake valve 62 has been issued is counted up (step 508). Then, the current stopping time period tstp is latched (recorded) as the stopping time period tstpl (step 510).

If, on the other hand, the determination of aforementioned step 504 is negative, the stopping time period tstp is counted up without counting up the intake pressure rise time period tstp_pa because of a situation in which the actual intake pressure pim is a value close to the atmospheric pressure pa (step 508). According to such processing, by calculating this intake pressure rise time period tstp_pa, the time period can be calculated that is necessary for the actual intake pressure pim to arrive at a value near the atmospheric pressure pa after the stopping request has been issued, in a case in which the intake pressure rise time period tstp_pa has been counted up until the determination of aforementioned step 504 becomes negative from a state in which it is positive. In addition, also in this case, the current stopping time period tstp is latched (recorded) as the stopping time period tstpl (step 510).

Furthermore, if it is determined in aforementioned step 500 that the stopping request for the intake valve 62 is present, that is to say, if it can be judged to be at the time of an issuance of the returning request for the intake valve 62 or after the issuance, the intake pressure rise time period tstp_pa is cleared to be zero (step 514).

The routine shown in FIG. 9 will be described again. In the routine shown in FIG. 9, after the intake pressure rise time period tstp_pa is read in aforementioned step 306, it is then determined whether or not there is the stopping failure of the intake valve 62, in accordance with the processing of the routine shown in FIG. 12 described later (step 308).

If, on the other hand, it is determined in aforementioned step 304 that the stopping request for the intake valve 62 is not present, that is to say, if it can be judged to be at the time of an issuance of the returning request for the intake valve 62 or after the issuance, the stopping time period tstpl recorded in aforementioned step 510 is then read (step 310) and it is determined whether or not there is the returning failure of the intake valve 62 (step 312). In addition, in the routine shown in FIG. 9, if the determination request is not the ON state (step 300), or if the stopping failure determination (step 308) or the returning failure determination (step 312) of the intake valve 62 is ended, the determination request is turned OFF (step 314).

Figure 12:
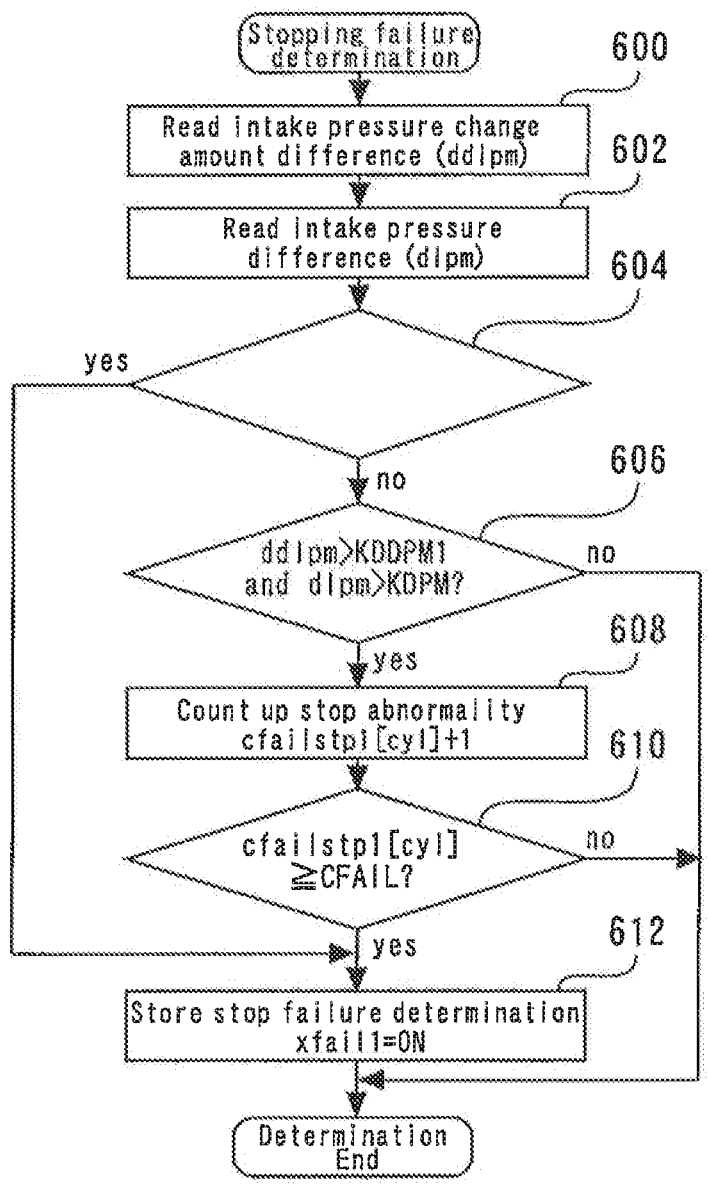
FIG. 12 is a flowchart that represents the routine of the stopping failure determination of the intake valve in step 308 in FIG. 9.

Next, FIG. 12 is a flowchart that represents the routine of the stopping failure determination of the intake valve 62 in step 308 in FIG. 9.

According to the routine shown in FIG. 12, first, the intake pressure change amount difference ddlpm calculated in aforementioned step 114 is read (step 600). Then, the intake pressure difference dlpm calculated in aforementioned step 116 is read (step 602).

Next, it is determined whether or not the time period required to arrive at the atmospheric pressure after an issuance of the stopping request for the intake valve 62 is longer than that in a case in which the stopping operation is normal, that is to say, whether or not the aforementioned intake pressure rise time period tstp_pa is longer than or equal to the aforementioned predetermined arrival time period determination value α (step 604).

If the determination of aforementioned step 604 is negative, it is then determined whether or not the intake pressure change amount difference ddlpm is larger than a predetermined determination value KDDPM1 and the intake pressure difference dlpm is larger than a predetermined determination value KDPM (step 606). These determination values KDDPM1 and KDPM are values that are set in advance as threshold values for determining the stopping failure of the intake valve 62. As a result of this, if the determination of present step 606 is positive, it is determined that an abnormality has occurred in the stopping operation of the intake valve 62 in the current determination target cylinder, and a stopping abnormality counter cfailstp1 is counted up (step 608).

Next, it is determined whether or not the stopping abnormality counter cfailstp1 is larger than or equal to a predetermined value CFAIL1 (step 610). As a result of this, if the stopping abnormality counter cfailstp1 is determined to be larger than or equal to the aforementioned predetermined value CFAIL1, it is definitely determined that the stopping failure of the intake valve 62 has occurred at the current determination target cylinder, and the current determination result of the stopping failure is recorded (a stopping failure determination flag xfail1 is turned ON) (step 612).

If, on the other hand, it is determined in aforementioned step 604 that the aforementioned intake pressure rise time period tstp_pa is longer than or equal to the aforementioned predetermined arrival time period determination value α, the stopping failure of the intake valve 62 has occurred in any of the cylinders, and the current determination result of the stopping failure is recorded (step 612).

Figure 13:
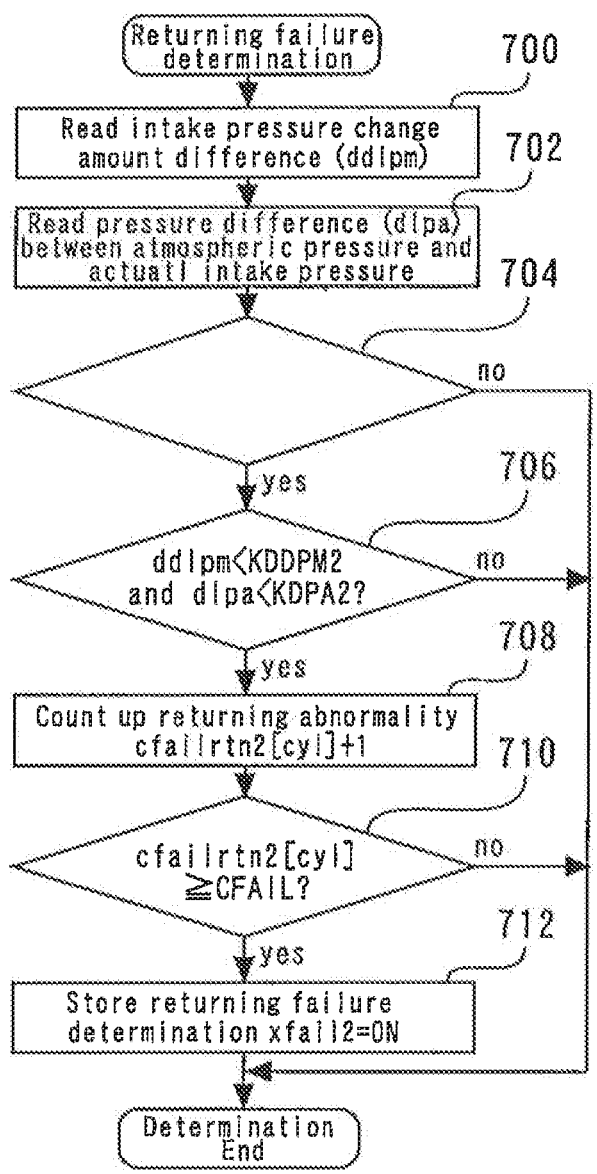
FIG. 13 is a flowchart that represents the routine of the returning failure determination of the intake valve in step 312 in FIG. 9.

Next, FIG. 13 is a flowchart that represents the routine of the returning failure determination of the intake valve 62 in step 312 in FIG. 9.

According to the routine shown in FIG. 13, first, the intake pressure change amount difference ddlpm calculated in aforementioned step 114 is read (step 700). Then, the pressure difference dlpa calculated in aforementioned step 118 is read (step 702).

Next, the stopping time period tstpl immediately before an issuance of the current returning request for the intake valve 62 is longer than or equal to a predetermined value β (step 704). More specifically, on the premise of performing the failure determination by use of the atmospheric pressure pa in next step 706, it is determined by the processing of present step 704 whether or not the actual intake pressure pim at the time of an issuance of the returning request has arrived at a value near the atmospheric pressure pa.

If the determination of aforementioned step 704 is positive, it is then determined whether or not the intake pressure change amount difference ddlpm is smaller than a predetermined determination value KDDPM2 and the pressure difference dlpa between the atmospheric pressure pa and the actual intake pressure pim is smaller than a predetermined determination value KDPA2 (step 706). These determination values KDDPM2 and KDPA2 are values that are set in advance as threshold values for determining the returning failure of the intake valve 62. As a result of this if the determination of present step 706 is positive, it is determined that an abnormality of the returning operation of the intake valve 62 has occurred at the current determination target cylinder, and a returning abnormality counter cfailrtn2 is counted up (step 708).

Next, it is determined whether or not the returning abnormality counter cfailrtn2 is larger than or equal to a predetermined value CFAIL2 (step 710). As a result of this, if the returning abnormality counter cfailrtn2 is larger than or equal to the aforementioned predetermined value CFAIL2, it is definitely determined that the returning failure of the intake valve 62 has occurred at the current determination target cylinder, and the current determination result of the returning failure is recorded (a returning failure determination flag xfail2 is turned ON) (step 712).

As described so far, according to the main routine shown in FIG. 9, the determination target cylinder of the failure is discriminated (identified), and on that basis, it is determined whether or not there is the stopping failure or the returning failure of the intake valve 62, in accordance whether or not the stopping request for the intake valve 62 is present.

In addition, according to the routine shown in FIG. 12, at the time of the determination of the stopping failure of the intake valve 62, it is judged that the stopping failure of the intake valve 62 has occurred at the current determination target cylinder if the intake pressure change amount difference ddlpm is larger than the determination value KDDPM1 and the intake pressure difference dlpm is larger than the determination value KDPM. As already described, when the stopping failure has occurred, the difference between the actual intake pressure pim and the pseudo intake pressure pmcrt is produced. Therefore, by performing the determination based on the intake pressure difference dlpm, the stopping failure of the intake valve 62 can be detected.

In addition, according to the routine shown in FIG. 12, by use of the intake pressure change amount difference ddlpm including the actual intake pressure change amount dlpim, the determination can be performed by means of a slope of a change in the actual intake pressure pim in a situation in which the intake stroke transitions to the abnormal cylinder from the normal cylinder or a situation in which the intake stroke transitions to the normal cylinder from the abnormal cylinder. Because of this, in a case in which the actual intake pressure pim changes as shown in FIG. 3, a cylinder at which the stopping failure has occurred can be identified. Further, the determination using a large value (nearly double) is allowed in a case of using the intake pressure change amount difference ddlpm including the actual intake pressure change amount dlpim, as compared with a case of using the actual intake pressure pim alone. This makes it possible to improve the detection accuracy of the stopping failure. Furthermore, during a time period after the stopping operation of the intake valve 62 in a cylinder at which the delay of the stopping occurred is normally started, such as, a time period from the second cycle onward after the stopping request in FIG. 3, or a time period from the third cycle onward after the stopping request in FIG. 4, the actual intake pressure pim shows a change having the tendency similar to that of the pseudo intake pressure pmcrt. Therefore, by use of the actual intake pressure change amount dlpim or the intake pressure change amount difference ddlpm therewith as well as the intake pressure difference dlpm, it can be grasped that the delay of the stopping of the intake valve 62 has been resolved, and thereby, the determination of the stopping failure can be performed more accurately.

Moreover, according to the routine shown in FIG. 12, if the time period required to arrive at the atmospheric pressure after an issuance of the stopping request for the intake valve 62 is longer than that in a case in which the stopping operation is normal, it is determined that the stopping failure of the intake valve 62 has occurred at any of the cylinders. Such determination can detect the stopping failure by use of the time period until the actual intake pressure pim arrives at the atmospheric pressure pa after the issuance of the stopping request for the intake valve 62.

In addition, according to the routine shown in FIG. 13, at the time of the determination of the returning failure of the intake valve 62, it is judged that the returning failure of the intake valve 62 has occurred at the current determination target cylinder if the intake pressure change amount difference ddlpm is smaller than the determination value KDDPM2 and the pressure difference dlpa between the atmospheric pressure pa and the actual intake pressure pim is smaller than the determination value KDPA2. By confirming, by use of the pressure difference dlpa, a change in the actual intake pressure pim with respect to the atmospheric pressure pa after the returning request, the returning failure of the intake valve 62 can be detected.

Further, according to the routine shown in FIG. 13, by use of the intake pressure change amount difference ddlpm including the actual intake pressure change amount dlpim, a cylinder at which the returning failure has occurred can be identified in a case in which the actual intake pressure pim changes as shown in FIG. 5, for the season similar to that described for a case of the stopping failure. Furthermore, the determination using a large value (nearly double) is allowed as compared with a case of using the actual intake pressure change amount dlpim alone. This makes it possible to improve the detection accuracy of the returning failure. Moreover, by use of the actual intake pressure change amount dlpim or the intake pressure change amount difference ddlpm therewith as well as the pressure difference dlpa, it can be grasped that the delay of the returning of the intake valve 62 has been resolved (from the second cycle onward after the stopping request in FIG. 5), and thereby, the determination of the returning failure can be performed more accurately.

Incidentally, in the first embodiment, which has been described above, at the time of the determination of the stopping failure of the intake valve 62, the failure determination based on the intake pressure difference dlpm and the failure determination based on the intake pressure change amount difference ddlpm are combined with each other. However, the present invention is not limited to this manner, and for example, the following manner may be adopted.

More specifically, the failure determination based on the intake pressure difference dlpm may be performed alone. As already described, when the stopping failure has occurred, the difference between the actual intake pressure pim and the pseudo intake pressure pmcrt is produced. Therefore, even when the failure determination based on the intake pressure difference dlpm is performed alone, it can be determined that the stopping failure has occurred at any of the cylinders.

In addition, instead of the failure determination based on the intake pressure change amount difference ddlpm, the failure determination based on the actual intake pressure change amount dlpim may be performed in addition to the failure determination based on the intake pressure difference dlpm. When the intake stroke transitions to the failure cylinder from the normal cylinder after the stopping request, as already described, the actual intake pressure change amount dlpim becomes a negative value because the actual intake pressure pim decreases. Therefore, by determining whether the actual intake pressure change amount dlpim is positive or negative, a cylinder at which the stopping failure has occurred can be identified.

In addition, in the first embodiment, which has been described above, at the time of the determination of the returning failure of the intake valve 62, the failure determination based on the intake pressure change amount difference ddlpm and the failure determination based on the pressure difference dlpa between the atmospheric pressure pa and the actual intake pressure pim are combined with each other. However, the present invention is not limited to this manner, and for example, the following manner may be adopted.

More specifically, the failure determination based on the intake pressure difference dlpm may be performed alone, as with the case of determining the stopping failure. As already described, also when the returning failure has occurred, the difference between the actual intake pressure pim and the pseudo intake pressure pmcrt is produced. Therefore, even when the failure determination based on the intake pressure difference dlpm is performed alone, it can be determined that the returning failure has occurred at any of the cylinders.

In addition, instead of the failure determination based on the pressure difference dlpa between the atmospheric pressure pa and the actual intake pressure pim, the failure determination based on the intake pressure difference dlpm may be performed in addition to the failure determination based on the intake pressure change amount difference ddlpm. When the returning failure has occurred, the difference between the pseudo intake pressure pmcrt and the actual intake pressure pim that becomes a value near the atmospheric pressure pa increases. Therefore, it may be determined that the returning failure of the intake valve 62 has occurred if the intake pressure difference dlpm (second difference) obtained by subtracting the actual intake pressure pim at a predetermined crank angle associated with a predetermined determination target cylinder (for example, 60° CA after the top dead center) from the pseudo intake pressure pmcrt at the predetermined crank angle is smaller than a predetermined fifth determination value, and the intake pressure change amount difference ddlpm (first difference) obtained by subtracting the actual intake pressure change amount dlpim at a predetermined crank angle period associated with the determination target cylinder (in a four-cylinder engine, interval of 180° CA) from the pseudo intake pressure change amount dlpmcrt at the predetermined crank angle period is smaller than a predetermined sixth determination value.

Furthermore, instead of the failure determination based on the intake pressure change amount difference ddlpm, the failure determination based on the actual intake pressure change amount dlpim may be performed in addition to the failure determination based on the intake pressure difference dlpm, as with the case of determining the stopping failure of the intake valve 62. When the intake stroke transitions to the failure cylinder from the normal cylinder after the stopping request, as already described, the actual intake pressure change amount dlpim becomes a positive value because the actual intake pressure pim increases. Therefore, by determining whether the actual intake pressure change amount dlpim is positive or negative, a cylinder at which the returning failure has occurred can be identified.

Further, in the first embodiment, which has been described above, description of the failure determination method according to the present invention has been made by taking an example of the system in which the internal combustion engine 12 having the valve stop mechanism is mounted on the hybrid vehicle. However, the present invention is not limited to the application to a system in which an internal combustion engine having a valve stop mechanism is mounted on a hybrid vehicle, and can be similarly applied to a vehicle that is driven only by an internal combustion engine having a valve stop mechanism as a power source.

Furthermore, in the first embodiment, which has been described above, description has been made by taking an example of the internal combustion engine 12 of a straight four-cylinder type. However, the internal combustion engine to be addressed in the present invention is not limited to the straight four-cylinder type. More specifically, the present invention can be also applied to another type of an internal combustion engine by arbitrarily changing a crank angle and a crank angle period that are used for the failure determination processing.

It is noted that in the first embodiment, which has been described above, the ECU 40 executes a series of the processing of the above described routine shown in FIG. 7, whereby the "pseudo intake pressure obtaining means" according to the first aspect of the present invention is realized, the ECU 40 executes the above described processing of steps 606 and 608, whereby the "second failure determination means" according to the first aspect of the present invention is realized, and the ECU 40 executes a series of the processing of the above described main routine shown in FIG. 9, whereby the "failure determination means" according to the first aspect of the present invention is realized. In addition, 60° CA after the top dead center corresponds to the "predetermined crank angle" according to the first aspect of the present invention, and the intake pressure difference dlpm corresponds to the "second difference" according to the first aspect of the present invention.

Further, in the first embodiment, which has been described above, the ECU 40 executes the above described processing of steps 106 and 108, whereby the "first failure determination means" according to the second aspect of the present invention is realized. In addition, in the internal combustion engine 12 that is a four-cylinder engine, the interval of 180° CA corresponds to the "predetermined crank angle period" according to the second aspect of the present invention.

Furthermore, in the first embodiment, which has been described above, the intake pressure change amount difference ddlpm corresponds to the "first difference" according to the third aspect of the present invention.

Moreover, in the first embodiment, which has been described above, the ECU 40 executes the above described processing of step 100, whereby the "atmospheric pressure obtaining means" according to the fourth aspect of the present invention is realized, and the ECU 40 executes the above described processing of steps 706 and 708, whereby the "third failure determination means" according to the fourth aspect of the present invention is realized. In addition, the pressure difference dlpa corresponds to the "third difference" according to the fourth aspect of the present invention.

Moreover, in the first embodiment, which has been described above, the ECU 40 executes the above described processing of steps 604 and 612, whereby the "fourth failure determination means" according to the fifth aspect of the present invention is realized.

Moreover, in the first embodiment, which has been described above, the ECU 40 executes a series of the processing of the above described routine shown in FIG. 10, whereby the "cylinder discrimination means" according to the sixth to eighth aspects of the present invention is realized. In addition, the determination value KDPM corresponds to the "second determination value" according to the sixth aspect of the present invention, and the determination value KDDPM1 corresponds to the "first determination value" according to the sixth aspect of the present invention.

Moreover, in the first embodiment, which has been described above, the determination value KDPA2 corresponds to the "third determination value" according to the seventh aspect of the present invention, and the determination value KDDPM2 corresponds to the "fourth determination value" according to the seventh aspect of the present invention.

DESCRIPTION OF SYMBOLS 10 drive system
12 internal combustion engine
14 motor
40 ECU (Electronic Control Unit)
42 piston
46 intake passage
48 exhaust passage
52 throttle valve
54 throttle valve position sensor
56 intake pressure sensor
58 fuel injection valve
62 intake valve
64 exhaust valve
66 intake variable valve operating apparatus
68 exhaust variable valve operating apparatus
70 catalyst

The invention claimed is:

1. A control apparatus for an internal combustion engine, comprising:
a valve stop mechanism that is capable of switching an operational state of an intake valve between a valve operating state and a valve closed/stopped state;
a crank angle sensor for detecting a crank angle of an internal combustion engine;
an intake pressure sensor for detecting an actual intake pressure at an integral part of an intake passage that leads to a plurality of cylinders equipped with the internal combustion engine; and
a controller that is configured to:
determine whether or not there is a failure concerning the switching of the operational state of the intake valve between the valve operating state and the valve closed/stopped state by the valve stop mechanism, based on a difference of the actual intake pressure at a predetermined crank angle between two cylinders at which an explosion order is adjacent, in a case in which a normal cylinder is adjacent to a failure cylinder in the explosion order;
obtain, based on an operational condition of the internal combustion engine, a pseudo intake pressure in a situation in which a switching of the operational state between the valve operating state and the valve closed/stopped state is normally performed;
determine whether or not there is the failure concerning the switching of the operational state of the intake valve between the valve operating state and the valve closed/stopped state by the valve stop mechanism, based on a first difference between a difference of the actual intake pressure at a predetermined crank angle period and a difference of the pseudo intake pressure at the predetermined crank angle period;
discriminate a determination target cylinder that is subjected to failure determination, on a basis of the crank angle that is detected by the crank angle sensor; and
determine that a failure concerning a returning operation of the intake valve for switching the valve closed/stopped state to the valve operating state has occurred at the determination target cylinder, when a second difference that is obtained by subtracting the actual intake pressure at the predetermined crank angle associated with the determination target cylinder from the atmospheric air pressure is smaller than a predetermined first determination value, and the first difference that is obtained by subtracting the difference of the actual intake pressure at the predetermined crank angle period associated with the determination target cylinder from the difference of the pseudo intake pressure at the predetermined crank angle period is smaller than a predetermined second determination value, in a case in which a returning request to switch the valve closed/stopped state to the valve operating state for the intake valve is present.

2. The control apparatus for an internal combustion engine according to claim 1,
wherein the controller is further configured to:
discriminate a determination target cylinder that is subjected to failure determination, on a basis of the crank angle that is detected by the crank angle sensor;
determine whether or not there is the failure concerning the switching of the operational state of the intake valve between the valve operating state and the valve closed/stopped state by the valve stop mechanism, based on a third difference between the actual intake pressure and the pseudo intake pressure at a predetermined crank angle; and
determine that a failure concerning a stopping operation of the intake valve for switching the valve operating state to the valve closed/stopped state has occurred at the determination target cylinder, when the third difference that is obtained by subtracting the actual intake pressure at the predetermined crank angle associated with the determination target cylinder from the pseudo intake pressure at the predetermined crank angle is larger than a predetermined third determination value, and the first difference that is obtained by subtracting the difference of the actual intake pressure at the predetermined crank angle period associated with the determination target cylinder from the difference of the pseudo intake pressure at the predetermined crank angle period is larger than a predetermined fourth determination value, in a case in which a stopping request to switch the valve operating state to the valve closed/stopped state for the intake valve is present.

3. A control apparatus for an internal combustion engine, comprising:
a valve stop mechanism that is capable of switching an operational state of an intake valve between a valve operating state and a valve closed/stopped state:
a crank angle sensor for detecting a crank angle of an internal combustion engine:
an intake pressure sensor for detecting an actual intake pressure at an integral part of an intake passage that leads to a plurality of cylinders equipped with the internal combustion engine; and
a controller that is configured to:
determine whether or not there is a failure concerning the switching of the operational state of the intake valve between the valve operating state and the valve closed/stopped state by the valve stop mechanism, based on a difference of the actual intake pressure at a predetermined crank angle between two cylinders at which an explosion order is adjacent, in a case in which a normal cylinder is adjacent to a failure cylinder in the explosion order;
obtain an atmospheric pressure; and
determine whether or not there is a failure concerning a returning operation of the intake valve to switch the valve closed/stopped state to the valve operating state, based on a third difference between the actual intake pressure and the atmospheric pressure when a returning request to switch the valve closed/stopped state to the valve operating state for the intake valve has been issued.

4. The control apparatus for an internal combustion engine according to claim 3,
wherein the controller is further configured to, when a time period necessary for the actual intake pressure to arrive at the atmospheric air pressure is longer than or equal to a predetermined arrival time period determination value in a case in which a stopping request to switch the valve operating state to the valve closed/stopped state for the intake valve is present, determine that a failure concerning a stopping operation of the intake valve for switching the valve operating state to the valve closed/stopped state has occurred.

* * * * *